United States Patent
Nishikawa

(10) Patent No.: US 8,340,891 B2
(45) Date of Patent: Dec. 25, 2012

(54) TWO-WHEELED VEHICLE CONTROL APPARATUS AND TWO-WHEELED VEHICLE CONTROL METHOD

(75) Inventor: Gousuke Nishikawa, Yokohama (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 668 days.

(21) Appl. No.: 12/503,204

(22) Filed: Jul. 15, 2009

(65) Prior Publication Data

US 2010/0023248 A1 Jan. 28, 2010

(30) Foreign Application Priority Data

Jul. 22, 2008 (JP) ................................ 2008-188393

(51) Int. Cl.
*G06F 17/00* (2006.01)
(52) U.S. Cl. ........................ 701/124; 180/218
(58) Field of Classification Search ............. 701/41, 701/124; 180/218, 21, 6.5
See application file for complete search history.

(56) References Cited

U.S. PATENT DOCUMENTS

| | | | | |
|---|---|---|---|---|
| 6,367,817 B1 * | 4/2002 | Kamen et al. | ............. | 280/5.507 |
| 7,303,032 B2 * | 12/2007 | Kahlert et al. | ............. | 180/65.1 |
| 7,717,200 B2 * | 5/2010 | Kakinuma et al. | ............. | 180/6.5 |
| 7,740,099 B2 * | 6/2010 | Field et al. | ............. | 180/282 |
| 7,783,392 B2 * | 8/2010 | Oikawa | ............. | 701/1 |
| 7,979,179 B2 * | 7/2011 | Gansler | ............. | 701/38 |
| 8,014,923 B2 * | 9/2011 | Ishii et al. | ............. | 701/49 |
| 2004/0201271 A1 * | 10/2004 | Kakinuma et al. | ............. | 303/113.1 |
| 2005/0092533 A1 * | 5/2005 | Ishii | ............. | 180/65.1 |
| 2006/0260857 A1 * | 11/2006 | Kakinuma et al. | ............. | 180/218 |
| 2007/0084662 A1 * | 4/2007 | Oikawa | ............. | 180/272 |
| 2007/0251735 A1 * | 11/2007 | Kakinuma et al. | ............. | 180/6.5 |
| 2008/0082252 A1 | 4/2008 | Nishikawa | | |
| 2008/0147281 A1 * | 6/2008 | Ishii et al. | ............. | 701/49 |
| 2010/0017069 A1 * | 1/2010 | Miki et al. | ............. | 701/48 |

FOREIGN PATENT DOCUMENTS

| | | | |
|---|---|---|---|
| JP | 06347364 A | * | 12/1994 |
| JP | 2005-94898 | | 4/2005 |
| JP | 2007-269316 | | 10/2007 |
| JP | 2007283839 A | * | 11/2007 |
| JP | 2007-331443 | | 12/2007 |

* cited by examiner

*Primary Examiner* — Tuan C. To
(74) *Attorney, Agent, or Firm* — Oblon, Spivak, McClelland, Maier & Neustadt, L.L.P.

(57) ABSTRACT

The present invention aims to provide a parallel two-wheeled vehicle in which a rider can ride in safety without executing a predetermined procedure in boarding. A parallel two-wheeled vehicle control apparatus according to the present invention includes a drive unit that drives two wheels arranged on the same axis line in parallel, a rider detection unit that detects a state of a rider on a riding part that is connected to the wheels, a vehicle detection unit that detects a posture of a vehicle body, and a control unit that generates a control command to the drive unit and performs initial control to optimize transition of control from boarding to normal operation based on the detection result by the vehicle detection unit upon detection by the rider detection unit that the rider rides on the riding part while satisfying a certain riding condition.

8 Claims, 5 Drawing Sheets

TWO-WHEELED VEHICLE CONTROL APPARATUS AND TWO-WHEELED VEHICLE CONTROL METHOD

BACKGROUND OF THE INVENTION

1. Field of the Invention

The present invention relates to control of a parallel two-wheeled vehicle, and more particularly, to a technique of ensuring safety in boarding.

2. Description of Related Art

In recent years, a parallel two-wheeled vehicle configured to include two wheels arranged on the same axis in parallel has been developed. In such a parallel two-wheeled vehicle, a technique of ensuring safety in boarding has been demanded.

Japanese Unexamined Patent Application Publication No. 2007-331443 discloses a related art regarding a parallel two-wheeled vehicle. A travelling apparatus according to this document includes a means to stably operate a vehicle when the vehicle is in an empty state or when the vehicle is in a transition state between the empty state and a riding state. It is required in the travelling apparatus to operate a control start switch (servo switch) in order to start posture control and the like in boarding.

As stated above, according to the related parallel two-wheeled vehicle, a predetermined procedure (operation) needs to be executed in boarding. Without execution of such a procedure, travel control, posture control and the like of a vehicle may not be started or may not be accurately performed. However, not all the riders execute such a procedure in actual practical use. Accordingly, there is a possibility that deficiencies such as turnover or malfunction occur in boarding.

SUMMARY OF THE INVENTION

One of the objects of the present invention is to provide a parallel two-wheeled vehicle where safety riding is possible without executing a predetermined procedure in boarding.

A parallel two-wheeled vehicle control apparatus according to the present invention includes a drive unit that drives two wheels arranged on the same axis line in parallel, a rider detection unit that detects a state of a rider on a riding part that is connected to the wheels, a vehicle detection unit that detects a posture of a vehicle body, and a control unit that generates a control command to the drive unit and performs initial control to optimize transition of control from boarding to normal operation based on the detection result by the vehicle detection unit upon detection by the rider detection unit that the rider rides on the riding part while satisfying a certain riding condition.

According to this configuration, vehicle control is automatically started when the rider appropriately rides on the riding part. Then, regulatory transition from boarding to start of control for normal operation (when the boarding is completed) is smoothly executed. As such, the rider is able to ride the parallel two-wheeled vehicle with safety and comfort without executing a predetermined procedure in boarding.

Further, it is preferable that, when the riding condition is satisfied, the vehicle detection unit detects a pitch axis angle of the vehicle body, and the control unit sets the pitch axis angle to a temporary target pitch axis angle, and gradually changes the temporary target pitch axis angle to a final target pitch axis angle.

As stated above, the setting of the target pitch axis angle is gradually changed from a value measured by the vehicle detection unit to the final target pitch axis angle that is employed in the normal control, whereby the posture control by the control unit can be smoothly executed and the abrupt operation can be prevented.

Further, the control unit preferably performs processing to keep a rate of change of the target pitch axis angle constant.

Accordingly, the target pitch axis angle can be smoothly changed to the final target pitch axis angle.

Furthermore, the control unit preferably sets time until when the temporary target pitch axis angle is changed to the final target pitch axis angle based on the rate of change.

Further, the control unit preferably sets as a part of or all of the riding condition that both feet of the rider are placed on the riding part.

Furthermore, the control unit preferably generates the control command only when the pitch axis angle is within an appropriate range.

Accordingly, the control can be executed only when the riding state of the rider or the posture state of the vehicle is appropriate.

Moreover, the present invention relates to a parallel two-wheeled vehicle control method, including detecting a state of a rider on a riding part that is connected to two wheels arranged on the same axis line in parallel, detecting a posture of a vehicle body, determining whether the rider rides on the riding part while satisfying a certain riding condition, and optimizing transition from boarding to normal operation in controlling driving power of the wheels based on the posture of the vehicle body when the riding condition is satisfied.

Further, the parallel two-wheeled vehicle control method preferably includes, when the riding condition is satisfied, detecting a pitch axis angle of the vehicle body, and setting the pitch axis angle to a temporary target pitch axis angle, and gradually changing the temporary target pitch axis angle to a final target pitch axis angle.

Furthermore, the parallel two-wheeled vehicle control method preferably includes performing processing to keep a rate of change of the target pitch axis angle constant.

Additionally, the parallel two-wheeled vehicle control method preferably includes setting time until when the temporary target pitch axis angle is changed to the final target pitch axis angle based on the rate of change.

In addition, the parallel two-wheeled vehicle control method includes setting as a part of or all of the riding condition that both feet of the rider are placed on the riding part.

Still further, the parallel two-wheeled vehicle control method preferably generates a command to control the driving power of the wheels only when the pitch axis angle is within an appropriate range.

The above parallel two-wheeled vehicle control method is based on the same technical idea as the parallel two-wheeled vehicle control apparatus, and those effects are the same.

According to the present invention, it is possible to provide a parallel two-wheeled vehicle where safety riding is possible without executing a predetermined procedure in boarding.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Embodiment

Figure 1:
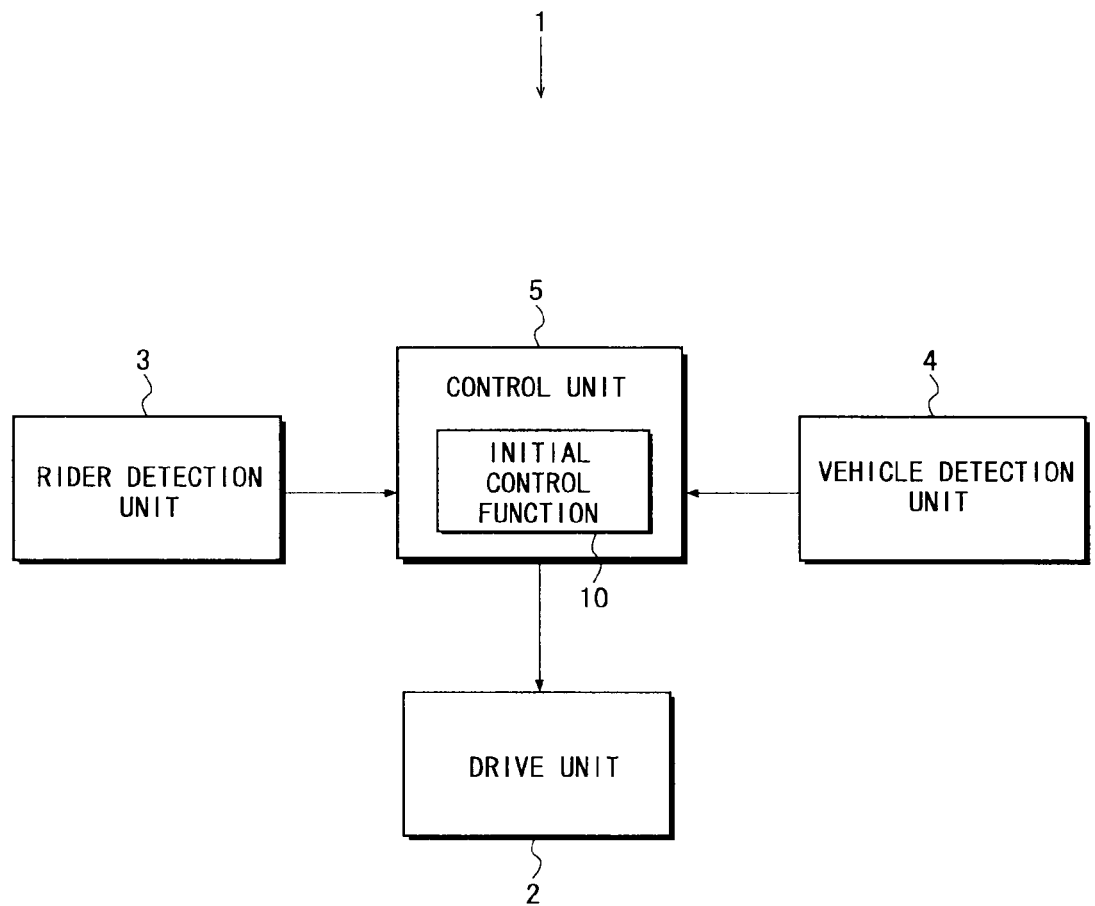
FIG. 1 is a block diagram showing a functional structure of a parallel two-wheeled vehicle control apparatus according to a first embodiment of the present invention.

FIG. 1 shows a functional structure of a parallel two-wheeled vehicle control apparatus 1 according to the first embodiment. The parallel two-wheeled vehicle control apparatus 1 includes a drive unit 2, a rider detection unit 3, a vehicle detection unit 4, and a control unit 5.

The drive unit 2 independently drives two wheels that are arranged on the same axis line in parallel.

The rider detection unit 3 detects a state of a rider on a riding part which is connected to the wheels.

The vehicle detection unit 4 detects a posture of a vehicle body of the parallel two-wheeled vehicle.

The control unit 5 includes an initial control function 10 that generates a control command to the drive unit 2 and optimizes transition of control from boarding to normal operation based on a detection result by the vehicle detection unit 4 upon detection by the rider detection unit 3 that the rider rides a vehicle on a riding part while satisfying a certain riding condition.

According to the configuration above, vehicle control is automatically started when the rider appropriately rides on the riding part. Then, regulatory transition from boarding to start of control of normal operation is smoothly carried out. As such, the rider is able to ride the parallel two-wheeled vehicle with safety and comfort without performing a predetermined procedure in boarding.

Figure 2A:
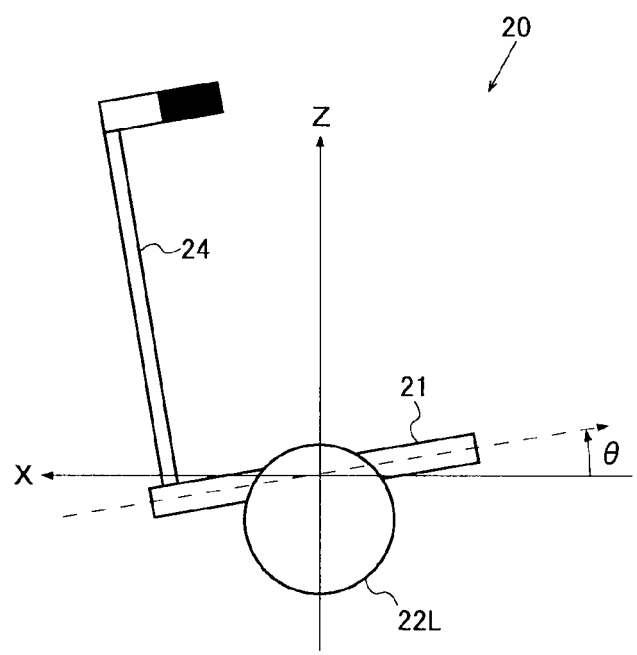
FIG. 2A is a side view schematically showing the structure of a parallel two-wheeled vehicle to which the parallel two-wheeled vehicle control apparatus according to the first embodiment is applied.
Figure 2B:
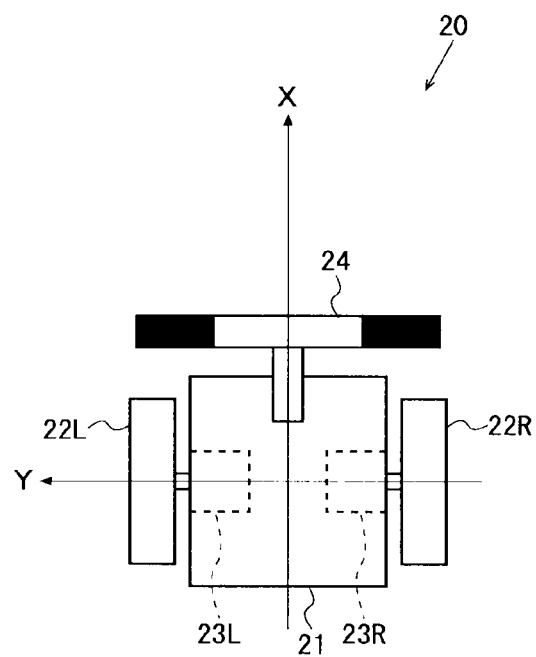
FIG. 2B is a top view schematically showing the structure of the parallel two-wheeled vehicle to which the parallel two-wheeled vehicle control apparatus according to the first embodiment is applied.

FIGS. 2A and 2B schematically show the structure of the parallel two-wheeled vehicle 20 to which the parallel two-wheeled vehicle control apparatus 1 according to the first embodiment is applied. In the parallel two-wheeled vehicle 20, wheels 22L and 22R are provided on the same axis line in parallel with respect to the riding part 21 for a rider to ride. The parallel two-wheeled vehicle 20 further includes drivers 23L and 23R composed of electric motors or the like that produce driving power independently for the respective wheels 22L and 22R. In the riding part 21, various sensors or switches are incorporated to detect a state of a rider (relation between the rider and the riding part 21). In the parallel two-wheeled vehicle 20 according to this example, a handle 24 is placed for the rider to hold and operate the vehicle. Further, in FIGS. 2A and 2B, coordinate systems that correspond to the parallel two-wheeled vehicle 20 are shown, where an X-axis is a vertical direction to a wheel axle and parallel to the ground, a Y-axis is a direction of the wheel axle, a Z-axis is a vertical direction to the wheel axle, and a pitch axis angle θ is an angle around the wheel axle.

Figure 3:
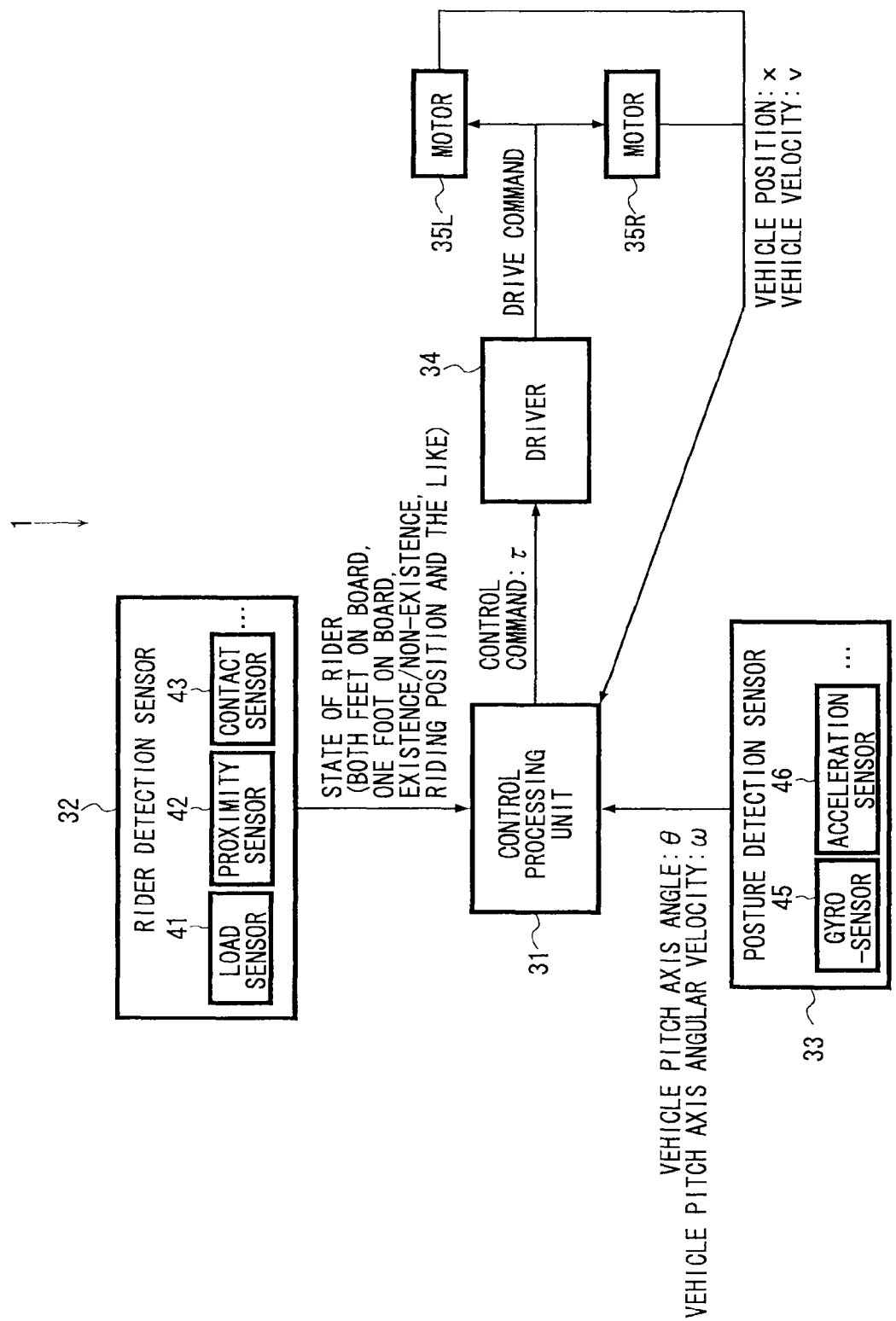
FIG. 3 is a block diagram showing a configuration example of the parallel two-wheeled vehicle control apparatus according to the first embodiment.

FIG. 3 is a specific configuration example of the parallel two-wheeled vehicle control apparatus 1 according to the first embodiment. The parallel two-wheeled vehicle control apparatus 1 includes a control processing unit 31, a rider detection sensor 32, a posture detection sensor 33, a driver 34, and motors 35L and 35R.

The control processing unit 31 is composed by collaboration of a CPU, a ROM, a RAM, a predetermined program and so on, and generates and outputs a control command t to the driver 34 based on detection signals from the rider detection sensor 32 and the posture detection sensor 33 that will later be described, and feedback signals from the motors 35L and 35R. The driver 34 that is composed of an actuator or the like generates a predetermined drive torque upon receiving the control command t and supplies the predetermined drive torque to each of the motors 35L and 35R as a drive command. The information based on the rotation of the motors 35L and 35R including a vehicle position x and a vehicle velocity v is fed back to the control processing unit 31. Accordingly, the posture control and the travel control of the parallel two-wheeled vehicle 20 are executed. The control command t can be obtained from the following formula (1), for example.

$$\tau = -Kp^*(\theta ref - \theta) - Kd^*(\omega ref - \omega) - Ki^* \int (\theta ref - \theta) dt \quad (1)$$

Note that Kp, Kd, and Ki represent control gain parameters. Further, θref in the formula (1) represents a target pitch axis angle and ωref represents a target pitch axis angular velocity.

The rider detection sensor 32 is a plurality of sensors to detect a state of a rider on the riding part 21, and is composed of a load sensor 41, a proximity sensor 42, and a contact sensor 43, for example. The detection results by these sensors 41, 42, 43 are output to the control processing unit 31, and are used to judge whether both feet of the rider are placed on the riding part 21, whether only one foot is placed, whether the rider is on the riding part 21, in which position on the riding part 21 the rider is, and the like. Note that any device with known configuration and effect can be used as appropriate as the sensors 41, 42, and 43.

The posture detection sensor 33 is a plurality of sensors to detect the posture of the parallel two-wheeled vehicle 20, and is composed of a gyro-sensor 45 and an acceleration sensor 46, for example. The detection results by these sensors 45 and 46 are output to the control processing unit 31 and used to judge the pitch axis angle θ or the pitch axis angular velocity ω or the like. Note that any device with known configuration and effect can be used as appropriate as the sensors 45 and 46.

The control processing unit 31 performs initial control to optimize the control from boarding to normal operation of the rider based on the detection signals from the rider detection sensor 32 and the posture detection sensor 33, the feedback signals from the motors 35L and 35R (a vehicle position x, a vehicle velocity v) and the like.

Figure 4:
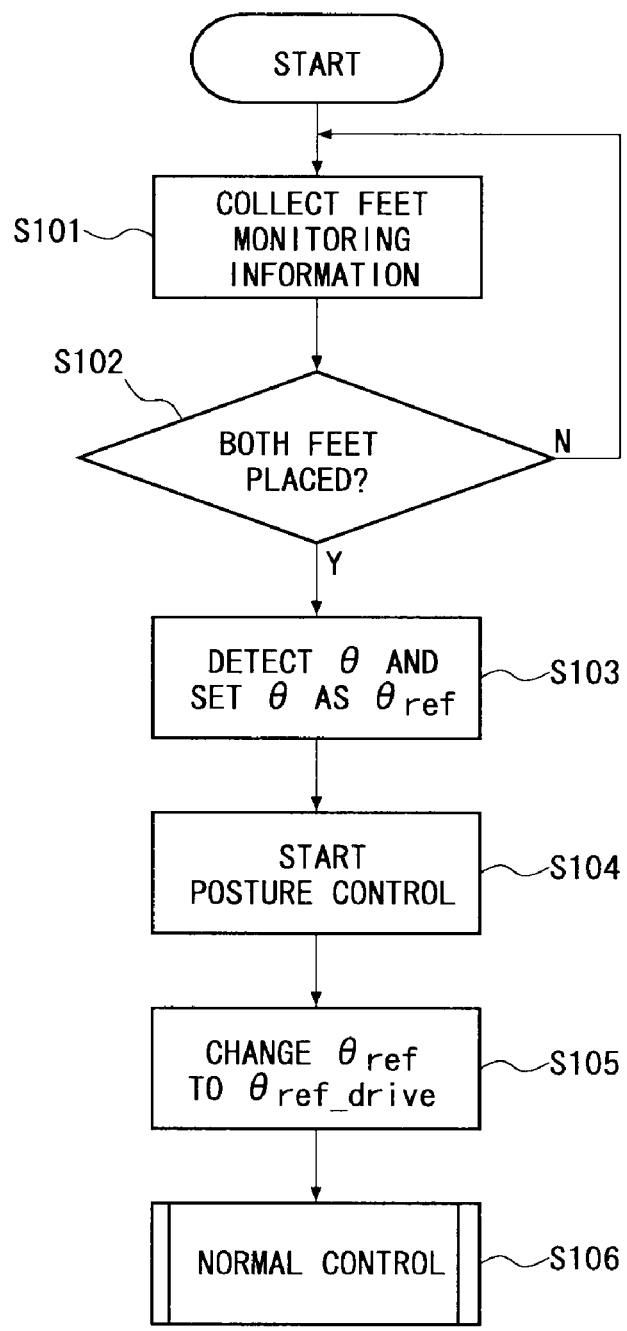
FIG. 4 is a flow chart showing one example of initial control by the parallel two-wheeled vehicle control apparatus according to the first embodiment.

FIG. 4 shows one example of the initial control by the parallel two-wheeled vehicle control apparatus 1 according to the first embodiment. This control routine is started after a main power source of the parallel two-wheeled vehicle 20 is turned on, for example. First, the rider detection sensor 32 collects information regarding the riding part 21 and the feet of the rider (S101) to judge whether both feet of the rider are placed on the riding part 21 (S102). When the both feet are not placed on the riding part 21 (N) in step S102, the operation goes back to step S101. On the other hand, when the both feet are placed on the riding part 21 (Y), a target value to control the posture of the parallel two-wheeled vehicle 20 is set based on the detection result by the posture detection sensor 33 (S103), and the posture control is started (S104).

In summary, in steps S102 to S104, when the both feet of the rider are placed on the riding part 21, the pitch axis angle θ at this time is detected. Then, this θ is set as a temporary target pitch axis angle θref in the above formula (1), to start the posture control by the formula (1).

Then, the temporary target pitch axis angle θref is gradually changed to a final target pitch axis angle θref_drive in the completion of the boarding (S105). For example, θref can be changed according to the formula (2) below.

$$\theta\text{ref}(t)=(\theta\text{ref\_drive}-\theta\text{ref\_start})/t\_\text{res}*t+\theta\text{ref\_start} \quad (2)$$

However, with only the formula (2), a ratio that the temporary target pitch axis angle θref is changed (tilt component of the formula (2)) may vary depending on the angles in which both feet of the rider are placed on the riding part 21, which may make it impossible for the rider to obtain a constant riding feeling.

In order to make a rate of change when changing the temporary target pitch axis angle θref constant, the condition of the formula (3) below is added. Accordingly, it is possible for the rider to obtain a constant riding feeling regardless of the angle in which both feet of the rider are placed on the riding part 21.

$$t\_\text{res}=|\theta\text{ref\_start}/\text{rate}|(t\_\text{res}\geqq 0) \quad (3)$$

Note that t represents elapsed time from when the both feet are placed on the riding part 21 and the posture control is started. θref_drive represents a target pitch axis angle when the boarding is completed (normal operation), which is the final target pitch axis angle (for example, 0° when the posture of the vehicle when the boarding is completed is kept parallel). θref_start represents a pitch axis angle of the vehicle at a time when the both feet are placed on the riding part 21. t_res represents a time it takes to move on to the final target pitch axis angle θref_drive. The rate in the formula (3) is a set value to define a certain rate of change (tilt component) in the formula (2).

After the time t_res has elapsed (when θref reaches θref_drive), the boarding is completed and the normal control is carried out (S106).

According to the parallel two-wheeled vehicle control apparatus 1 of the first embodiment, the posture control of the parallel two-wheeled vehicle 20 is automatically started when the rider appropriately rides on the riding part 21. Then, regulatory transition from boarding to start of control for normal operation (when the boarding is completed) can be smoothly performed. Accordingly, the rider is able to ride the parallel two-wheeled vehicle with safety and comfort without executing a predetermined procedure in boarding.

Further, when the predetermined riding condition is satisfied, which means when both feet are placed on the riding part 21 in the first embodiment, the pitch axis angle θ of the vehicle body is detected, the pitch axis angle θ is set to the temporary target pitch axis angle θref, and the temporary target pitch axis angle θref is gradually changed to the final target pitch axis angle θref_drive. Accordingly, smooth posture control is made possible from boarding to normal operation, and at the same time, the abrupt operation can be prevented. Note that the present invention is not limited to the riding condition that the rider has to place both feet on the riding part.

Further, as the rate of change of the temporary target pitch axis angle θref is kept constant by adding the condition of the above formula (3), this temporary target pitch axis angle θref can be smoothly changed to the final target pitch axis angle θref_drive. Further, a rider can get constant riding feeling regardless the angle in which the both feet of the rider are placed on the riding part 21.

Figure 5:
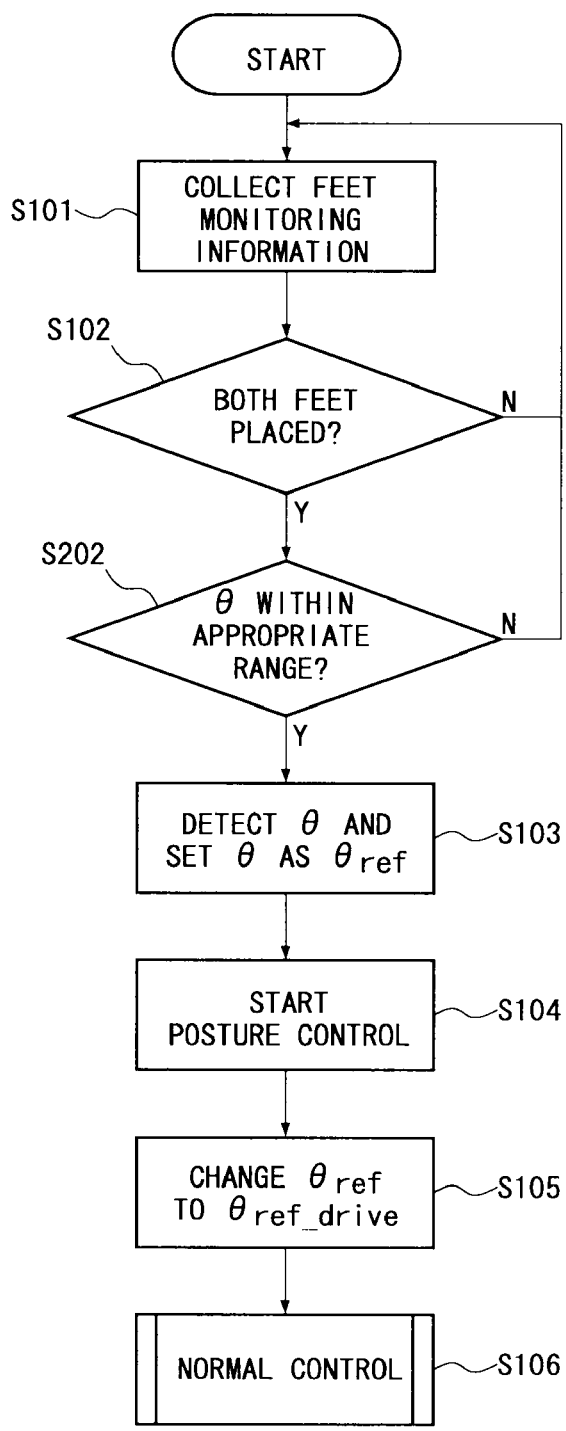
FIG. 5 is a flow chart showing another example of the initial control by the parallel two-wheeled vehicle control apparatus according to the first embodiment.

FIG. 5 shows another example of the initial control by the parallel two-wheeled vehicle control apparatus 1 according to the first embodiment. In this control routine, step S202 is inserted between the aforementioned steps S102 and S103. To be more specific, when it is judged in step S102 that the both feet of the rider are placed on the riding part 21 (Y), it is further judged in step S202 whether the pitch axis angle θ is within an appropriate range. When it is judged in step S202 that the pitch axis angle θ is out of the appropriate range, the operation goes back to step S101, and when it is judged that the pitch axis angle θ is within an appropriate range (Y), the operation moves to step S103.

Accordingly, even when the both feet are placed on the riding part 21, the posture control may not be performed when the vehicle tilts by an abnormal angle. Thus, the example shown in FIG. 5 can further improve the safety rather than the example shown in FIG. 4.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A parallel two-wheeled vehicle control apparatus comprising:
    a drive unit that independently drives two wheels arranged on the same axis line in parallel;
    a rider detection unit that detects whether or not a foot of a rider is placed on a riding part that is connected to the wheels;
    a vehicle detection unit that detects a posture of a vehicle body; and
    a control unit that generates a control command to the drive unit and performs initial control to stabilize a change of a pitch axis angle of the vehicle as the vehicle changes from an empty state to a riding state, wherein
    the vehicle detection unit detects the pitch axis angle of the vehicle in the initial control only when placement of at least one foot of the rider on the riding part is detected by the rider detection unit,
    the control unit sets the pitch axis angle detected in the initial control to a temporary target pitch axis angle and gradually changes the temporary target pitch axis angle to a final target pitch axis angle, and
    the control unit performs processing to keep a rate of change of the target pitch axis angle constant.

2. The parallel two-wheeled vehicle control apparatus according to claim 1, wherein the control unit sets time until when the temporary target pitch axis angle is changed to the final target pitch axis angle based on a rate of change.

3. The parallel two-wheeled vehicle control apparatus according to claim 1, wherein the vehicle detection unit starts detection of the pitch axis angle in the initial control upon detection that both feet of the rider are place on the riding part.

4. The parallel two-wheeled vehicle control apparatus according to claim 3, wherein the control unit generates the control command only when the pitch axis angle is within an appropriate range.

5. A parallel two-wheeled vehicle control method that performs initial control to stabilize a change of a pitch axis angle of a parallel two-wheeled vehicle as the vehicle changes from an empty state to a riding state, the method comprising:

detecting whether or not a foot of a rider is placed on a riding part that is connected to two wheels arranged on the same axis line in parallel;

detecting the pitch axis angle of the vehicle in the initial control only when placement of at least one foot of the rider on the riding part is detected;

setting the pitch axis angle detected in the initial control to a temporary target pitch axis angle and gradually changing the temporary target pitch axis angle to a final target pitch axis angle; and performing processing to keep a rate of change of the target pitch axis angle constant.

6. The parallel two-wheeled vehicle control method according to claim 5, comprising setting time until when the temporary target pitch axis angle is changed to the final target pitch axis angle based on the rate of change.

7. The parallel two-wheeled vehicle control method according to claim 5, wherein detection of the pitch axis angle in the initial control is started upon detection that both feet of the rider are placed on the riding part.

8. The parallel two-wheeled vehicle control method according to claim 7, wherein a control command for controlling driving of the wheels is generated only when the pitch axis angle is within an appropriate range.

* * * * *